US005145154A

United States Patent [19]

Bastille et al.

[11] Patent Number: 5,145,154

[45] Date of Patent: Sep. 8, 1992

[54] SELF CONTAINED POWER ASSIST LIFT JACK

[76] Inventors: Romain Bastille, 2, Mére Anthier Street, Riviére-du-Loup, Québec, Canada, G5R 3W9; Adélard Vaillancourt, 324, Boulevard Thériault, Riviére-du-Loup, Québec, Canada, G5R 3X8

[21] Appl. No.: 747,653

[22] Filed: Aug. 20, 1991

[51] Int. Cl.[5] .................... B60P 1/48

[52] U.S. Cl. .................... 254/10 B; 254/89 R; 254/124; 254/1

[58] Field of Search .................... 254/8 R, 8 B, 10 R, 254/10 B, 120, 131, 133, 93 R, 3 R, 89 R, 89 H, 1

[56] References Cited

U.S. PATENT DOCUMENTS

| | | | |
|---|---|---|---|
| 2,279,465 | 4/1942 | Jackson . | |
| 2,634,095 | 4/1953 | Branick . | |
| 2,747,652 | 5/1956 | Marsh . | |
| 3,788,414 | 1/1974 | Netter . | |
| 4,091,941 | 5/1978 | Shelton | 254/3 R |
| 4,604,022 | 8/1986 | Bourgraf | 254/120 |
| 4,979,723 | 12/1990 | Wittersheim . | |

FOREIGN PATENT DOCUMENTS

| | | | |
|---|---|---|---|
| 263648 | 8/1926 | Canada . | |
| 498529 | 12/1953 | Canada . | |
| 259523 | 9/1926 | United Kingdom | 254/8 B |

*Primary Examiner*—Robert C. Watson
*Attorney, Agent, or Firm*—Pierre LesPérance; Francois Martineau

[57] ABSTRACT

A lift device for lifting the front or rear of a snowmobile. The lift is actuated by a pivoted handle bar, controlling a snowmobile chassis-engaging bracket through a parallelogram linkage. A non-hydraulic ram is connected to the parallelogram linkage wherein fluid pressure inside the ram cylinder builds up as the piston rod thereof retracts concurrently with the lowering of the raised snowmobile under the load of the descending snowmobile. A releasable lock about the inner end of the handle bar maintains the ram in loaded condition, until a vehicle is to be lifted. The power assist ram reduces by up to 90% the effort needed to pivot handle bar to lift the vehicle.

4 Claims, 4 Drawing Sheets

SELF CONTAINED POWER ASSIST LIFT JACK

FIELD OF THE INVENTION

This invention relates to devices for lifting various ground standing heavy objects, particularly small vehicles.

BACKGROUND OF THE INVENTION

For the servicing of small vehicles such as snowmobiles, all terrain vehicles, small tractors, motorcycles, and the like, dedicated load lifting devices have been developed in the past. These vehicle servicing lifts usually include a platform, onto which rests the vehicle, and a power lift means—usually hydraulic—for vertically displacing the platform over ground. The vehicle raised by the power means onto its platform defines therebeneath a ground clearance, about which a mechanic can freely stand to work on the vehicle.

U.S. Pat. No. 3,788,414 issued in 1974 to Netter is typical of such lifts. The power means is a hydraulic ram, referenced 30, coupled to a hydraulic fluid source via hydraulic line 40. Of course, this hydraulic line renders the lift dependent upon a building installation having a hydraulic fluid supply to feed the hydraulic line 40. Accordingly, such lifts are not self-contained, i.e. that they rely on an external supply of fluid to operate. Another disadvantage of this patent is that, should the hydraulic pressure accidentally fall in the extended ram, a dangerous condition would occur in that the vehicle supporting platform would fall immediately onto the mechanic working thereunder.

Canadian patent 263,648 issued in 1926 to Walker Manufacturing Co., discloses a lifting jack having a deformable parallelogram linkage 8, 10 which introduces a measure of built-in safety feature into the lift to dampen the reaction of the lift should the hydraulic pressure fail.

Similar parallelogram linkage assemblies are found in the following lift jack patents: U.S. Pat. Nos. 3,788,414; 2,747,652; as well as 4,979,723.

All these prior art patents require an external power source i.e. a hydraulic fluid supply or a pressurized air supply. They are therefore dependent upon such an external power source, and thus, cannot be self-enclosed, portable units.

OBJECTS OF THE INVENTION

The gist of the invention is to provide a self-contained, portable, power assisted, passive type, lift device for servicing a small vehicle, wherein the power lifting means is independent of any external source of fluid or energy.

An additional object of the invention is to provide a lift device as afore-mentioned, which will have built-in safety means to prevent a dangerous condition associated with accidental release of the loaded power lifting means.

Another object of the invention is that the lift jack be installed easily to the vehicle to be lifted, in a very short time without any special training required.

SUMMARY OF THE INVENTION

In accordance with the teachings of the invention, there is disclosed a small vehicle servicing lift jack comprising: (a) hand-operated lifting means, for progressively lifting said vehicle to a raised position or lowering same therefrom; (b) lock means, to releasably maintain said lift jack at said raised position; (c) power assist means, for substantially reducing the required manual force to be applied at said hand-operated lifting means during said vehicle lifting; and (d) coupling means, operatively interconnecting said power assist means to said lifting means for concurrent action thereof; wherein said power assist means is of the passive, energy absorbing and restoring type, generated solely by collecting and storing the weight load energy associated with downward displacement of the vehicle during the lowering of said vehicle supporting lift jack, and, as said vehicle is subsequently lifted, transforming this stored energy into a spring-back biasing load for aiding in the lifting effort required at said hand-operated lifting means.

More particularly, the invention relates to a self-contained, portable, passive power assisted type, lift assembly for servicing a small vehicle by tilting the latter from one end thereof, comprising: (a) a ground supported, free, upright base frame; (b) connecting means, mounted to an upper portion of said base frame for relative movement thereabout for releasably supportingly engaging said vehicle one end; (c) first power means, for biasing displacement of said relatively movable connecting means between a first lower portion, in which said vehicle stands on the ground, and a second raised position, in which said vehicle is tilted at its said one end thereof; and (d) second power means, for power assisting said first power means in the lifting of said vehicle one end and being of the passive energy-absorbing and -releasing, non-hydraulic, type, wherein said second power means absorbs the weight load of said vehicle one end as the latter is lowered, and releases same as said vehicle one end is thereafter lifted, in the form of a power assist bias onto said first connecting means cooperatively with said first power means, whereby the power output required at said first power means for lifting said vehicle one end is significantly reduced.

DETAILED DESCRIPTION OF THE INVENTION

Figure 1:
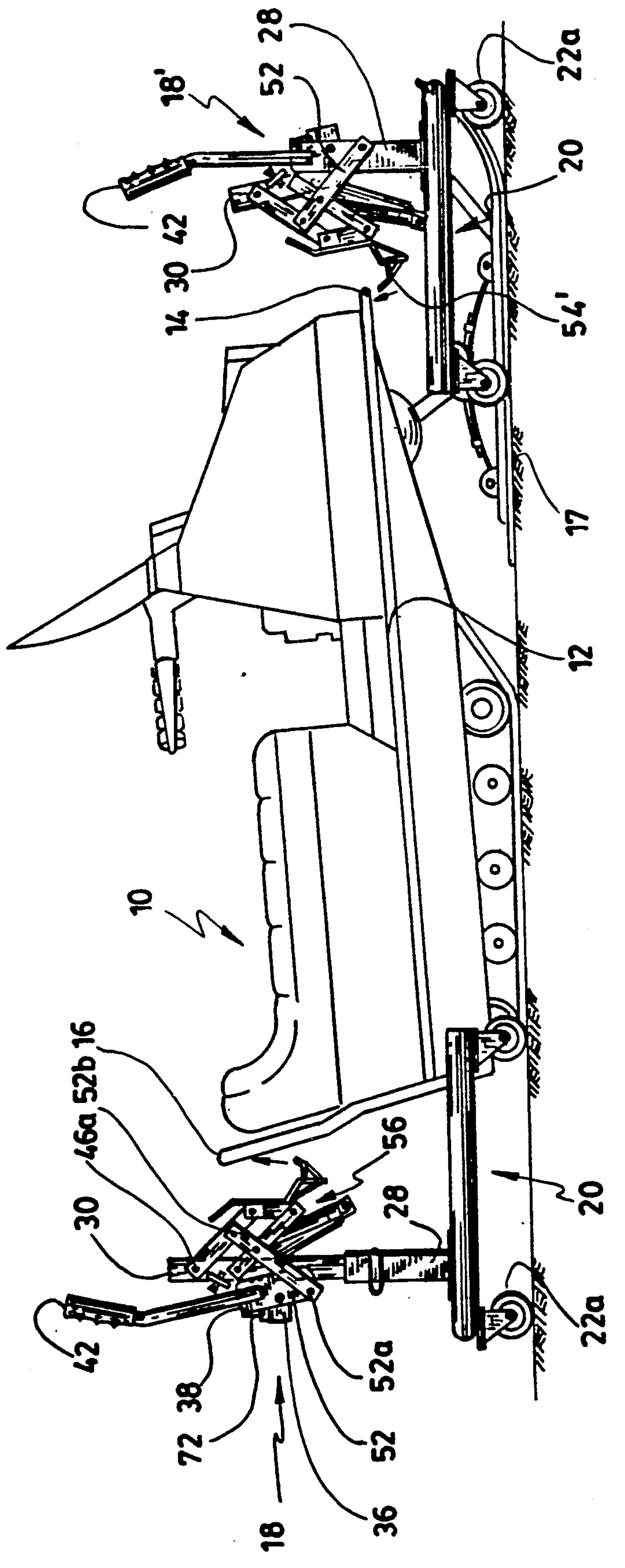
FIG. 1 is a side elevation of a ground standing snowmobile, at each of the front and rear ends of which is positioned a lowered load lifting device according to the invention.

Snowmobile 10 conventionally includes a ground supported chassis 12, defining a front, lower, horizontal, curved tubing section 14 and a rear, upper, horizontal, curved tubing section 16. In the normal ground standing position of the vehicle 10, tube 16 is at a horizontal level higher than that of tube 14. Each tube 14, 16 defines a ground clearance thereunder, since they project generally outwardly upwardly from the snowmobile body. A load lifting device 18 is releasably positioned about said ground clearance at the rear end of the snowmobile, and/or at the front end thereof at 18'.

Lifting device 18 (or 18') defines a tubular U-shape frame 20 supported over ground by three swivel caster wheels 22a–22c. Web 20a of U-frame 20 carries wheel 22a at its intermediate section, while legs 20b–20c thereof carry wheels 22b, 22c at their free or "forward" ends. From the intermediate section of the web 20a forwardly projects between legs 20b and 20c a horizontal plate 24, being anchored to web 20a. A telescopic standard 26 is mounted in upright condition to bottom plate 24, whereby the standard is at a position intermediate the rear wheel 22a and the front wheels 22b, 22c. Because of this optimal relative position of the casters, whatever the vertical load applied lengthwisely of lift standard 26, the base 20 will remain stable—there will be no tendency to sway laterally.

Standard 26 includes a lower cylinder 28 vertically anchored to base plate 24, and an upper piston tube 30, slidingly engaging into and partially extending upwardly from the top mouth 32 of cylinder 28. Cylinder 28 has a transverse through-bore 28a, and piston tube 30, a number of lengthwisely spaced transverse bores 30a at its inner portion, whereby a pin 34 is releasably engageable through bore 28a and a selected one of bores 30a for locking tube 30 into a selected partially extended condition relative to cylinder 28.

Tube 30 and the inner channel of cylinder 28 should be of polygonal cross-section, e.g. quadrangular, to prevent undesirable rotation of the tube inside its channel.

A rearwardly extending arm 36 is transversely anchored to the intermediate section of tube 30. A rectangular plate 38 is pivotally mounted at its intermediate section to arm 36, by pivot bolt 40. To one end of rectangular plate 38 is endwisely anchored an elongated handle bar 42, for manual rotation of plate 38 about its horizontal pivot axis 40. Preferably, the vertical plane of rotation of handle 42 clears standard 26. On the other hand, the vertical plane of rotation of handle end plate 38 must clear the proximate tube 30.

A deformable parallelogram linkage 44 is mounted to the outer end portion of tube 30, and includes two pairs of linkage arms 46, 48 endwisely pivotally mounted at one end thereof to tube 30 at lengthwisely spaced transverse pivotal axles 46a, 48a, respectively, and to a rigid bracket member 50 at their other ends about spaced pivotal axles 46b, 48b. By definition, the distance between axles 46a and 48a is equal to that between axles 46b, 48b, and bracket 50 remains parallel to standard 26.

Parallelogram linkage 44 is operatively connected by connecting or coupling means 52 to handle lever 42, whereby handle 42 is pivotable about its horizontal axle 40, preferably for approximately 2/5th of a turn as shown, between a first, limit, downwardly-rearwardly-inclined, operative position, in which both linkage arms 46, 48 extend upwardly and forwardly, and a second, limit, inoperative position, being substantially upright with both linkage arms 46, 48 extending downwardly and forwardly. In view thereof, the connecting means consists of a linkage arm 52, pivotally connected at one end 52a to the free end of rectangular plate 38—opposite the side of handle 42—, and at the opposite end 52b to an intermediate section of the upper linkage arm 46 of the parallelogram linkage 44 which is adjacent to the rotational plane of plate 38.

It is understood that with such a lever-actuated parallelogram linkage 44, bracket member 50 will enter into translational motion relative thereto as lever handle 42 is being induced to pivot between its two limit positions.

Bracket member 50 includes a pair of transversely spaced, forwardly extending, transverse stays 54 each generally forming an upright U in cross-section. Each U-stay 54 is endwisely anchored to bracket 50 and preferably reinforced by oblique cross-arms 55. U-stay 54 is to be engaged by a tubular frame portion 14 and 16 of chassis 12. If the lifter 20 is to be used at the rear end of snowmobile 10, then, the U-stay ears 54 are anchored transversely forwardly of the top edge of bracket stud 50, i.e. in substantial register with upper, forward, pivot axle 46b, for engagement thereover by upper tubular part 16. With the rear portion of snowmobile 10 freely engaged between the base legs 20b, 20c of the lifter 20, one needs only to downwardly push lever 42 from its inoperative or lowered position—figure 1—to its operative position or raised—figure 2—to lift the rear of skidoo 10.

Figure 6:
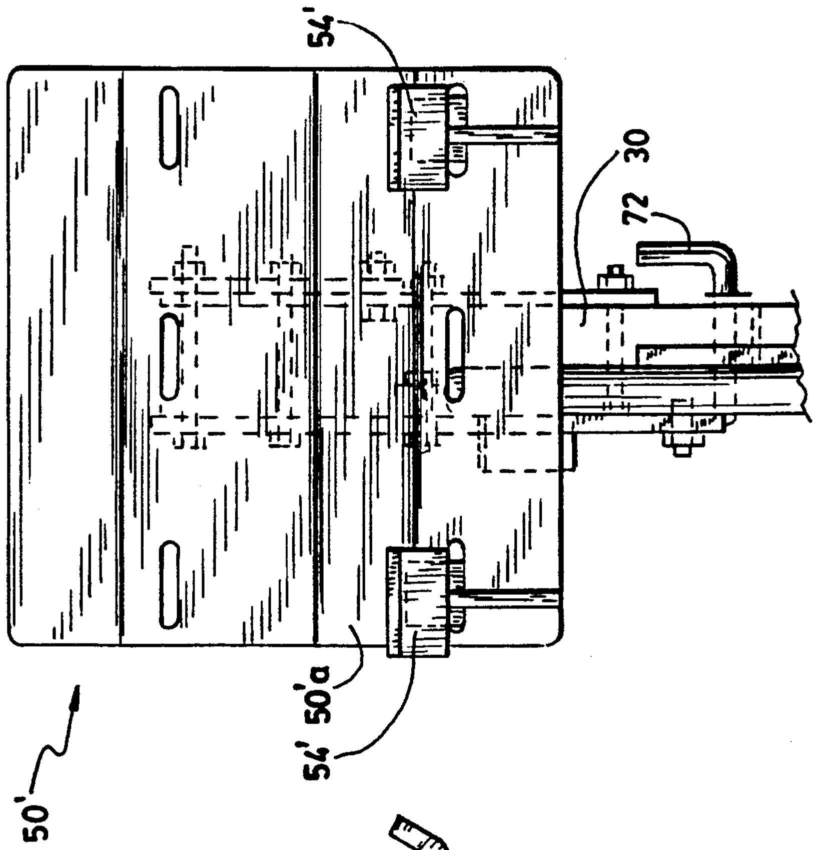
FIG. 6 is a right angle view of FIG. 5, showing in end view the two load support brackets.
Figure 5:
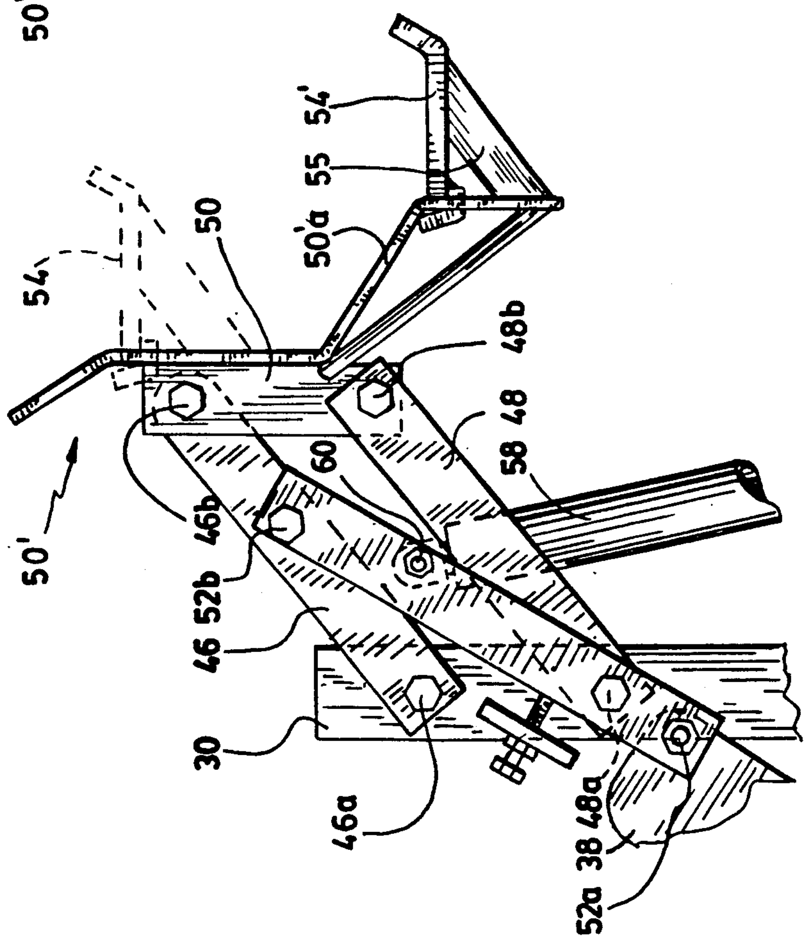
FIG. 5 is an enlarged view of the lifting device upper portion from FIG. 2, but showing in full lines and phantom lines respectively the two alternate positions of the load support bracket mounts.

If on the other hand the lifter 20 is to be used at the front end of snowmobile 10,—figures 5–6—, bracket member 50' is modified to become a panel defining a lower, forwardly bent portion 50'a from the bottom edge of which forwardly depend the two generally U-stay ears 54'. The front ski 17 of snowmobile 10 then extends through the ground clearance between base legs 20b, 20c while ears 54' engage horizontal tube 14 from snowmobile chassis 12—see FIG. 1.

It is understood that the web of U-ears 54 or 54' remains positively horizontal whatever the relative position of handle 42 and therefore of parallelogram linkage 44, so as not to compromise the stability of the lifted vehicle 10. One lifter 18 may be used either at the rear (FIG. 2) or at the front (FIG. 1) of snowmobile 10, or two lifters can be used simultaneously (FIG. 1) to lift the whole vehicle 10 at its opposite ends (not illustrated).

The heart of the invention lies in power assist means 56 that substantially reduces the manual force required for lowering handle 42 in view of lifting one end of vehicle 10. Power assist means 56 preferably consists of ram means including a cylinder 58, downwardly dependent from and endwisely pivoted at 60 to the intermediate section of the handle linkage arm 52, and a piston rod 62, slidingly engaged therein. A rigid bar 64 is endwisely anchored at 66 to the intermediate section of telescopic tube extension 30, extends in a downwardly forwardly inclined fashion and is pivotally connected at its outer end 68 to the piston rod 62. Ram cylinder 58 includes a sealed inner chamber, filled with a compressible fluid.

The length of bar 64 and the play of piston rod 62 into cylinder 58 are such that, as the lifted vehicle 10 is lowered manually by handle 42 from its raised position, under the bias mainly of the vehicle own weight, parallelogram linkage 44 will pivot downwardly about axles 46a, 48a while linkage 52 will concurrently and progressively enter in a downward translational motion about axle 52a—but will not rotate—, thus retracting piston rod 62 into ram cylinder 58, wherein the fluid therein will become progressively more compressed. As handle 42 is brought to its upright position, the rear end of vehicle 10 reaches the ground, piston 62 is fully retracted in ram cylinder 58, and fluid pressure, inside the fluid-tight inner chamber of ram cylinder 58 is at a maximum. The upward rearward reactive bias applied by the compressed fluid against the piston rod head to extend rod 62 away from the cylinder 58, is factory adjusted to be slightly smaller than the weight vector of force of the snowmobile end portion about chassis tube 14 or 16, carried by the support bracket 50' or 50 respectively.

Hence, the effort needed to upwardly pivot handle 42 to subsequently lift the vehicle rear end portion will be slight, e.g. about 10% of the unassisted manual lifting force that would be required for directly lifting the chassis tube 14 or 16. This is because ram means 58 will power assist the upward translation of linkage arm 52 and associated rotation of parallelogram linkage 44 associated with fluid pressure release upon induced extension of piston rod 62.

To maintain the lift means 18 in its loaded condition (FIG. 1), i.e. with piston rod 62 fully retracted and cam cylinder chamber gas at maximum compressed condition, a safety lock means 70 is provided and engaged before the lift jack 18 is to be released from the vehicle in view of transfer e.g. to a second vehicle. Releasable lock means 70 preferably consists of a J-bolt 72, slidable extending through a through-bore 78 about an upright ear 76 which upwardly anchoringly depends from vertical bar 36. Ear 76 is at the outer free end of bar 36 on the side thereof opposite plate 38. J-bolt 72 will rearwardly clear the rectangular handle plate 38 upon handle 42 being in its upright inoperative position of FIG. 1, or so as to slidingly engage at the rear thereof to thus constitute a transverse seat against which will forcibly abut handle plate 38 under counterclockwise rotational bias from loaded ram means 56. Releasing J-bolt 72 will enable handle 42 to rotatingly yield to the high pressured ram means 56 so as to power lift the vehicle 10.

It is understood that in the ram-loaded condition of lift means 18, elongated ram members 58, 62 extend almost orthogonally to linkage arms 46, 48 of parallelogram linkage 44—FIG. 1 —, whereas in the ram-unloaded condition thereof, elongated ram members 58, 62 extend almost parallel to linkage arm 46, 48. The latter assembly is a built-in safety feature integral to the deformable parallelogram linkage 44, in that it provides a measure of relative stability to the lowered (loaded) lift means, whereby release of pin 72 will not generate a dangerous condition should handle 42 brutally and immediately swing to unload ram means 58, but rather will move slowly initially at least. The pivoting motion of handle 42 associated with ram means loading/unloading, is of course manually controlled at the handle free outer end.

Figure 2:
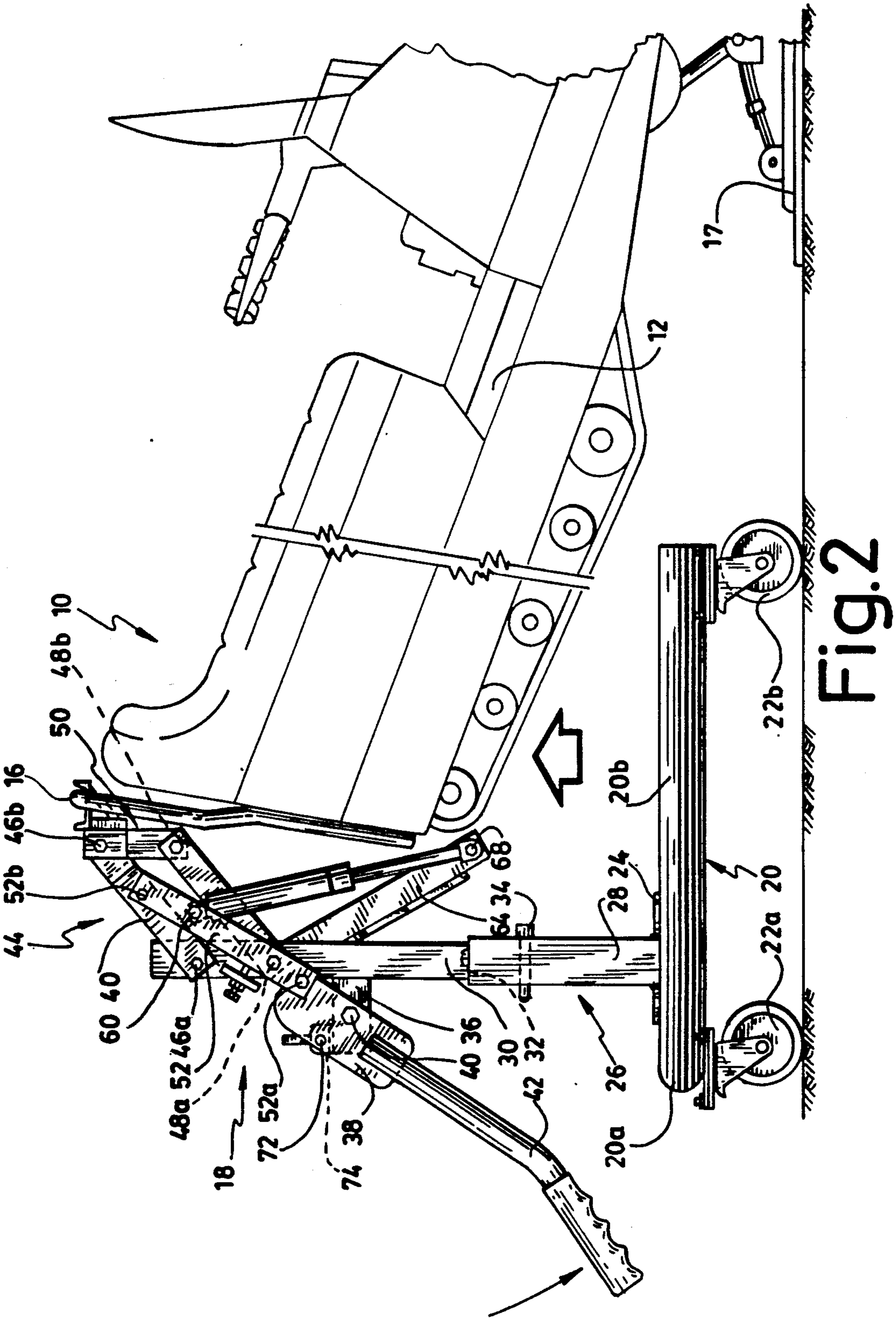
FIG. 2 is a partly broken side elevation of a snowmobile showing at an enlarged scale the present load lifting device in its operative, raised position, with the snowmobile rear end being lifted.
Figure 4:
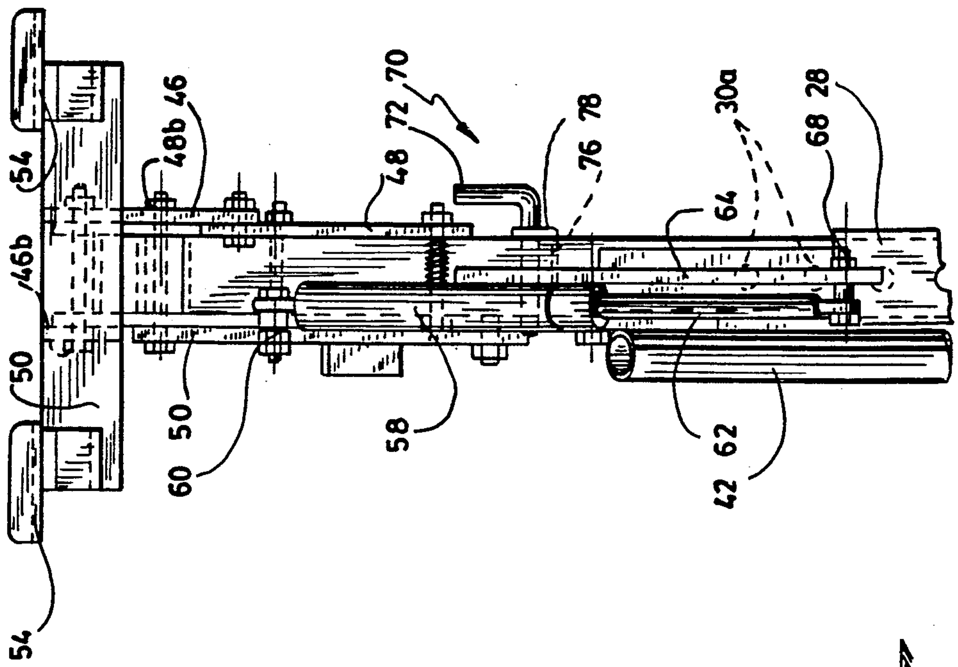
FIG. 4 is an enlarged more detailed view of the upper portion of FIG. 3.
Figure 3:
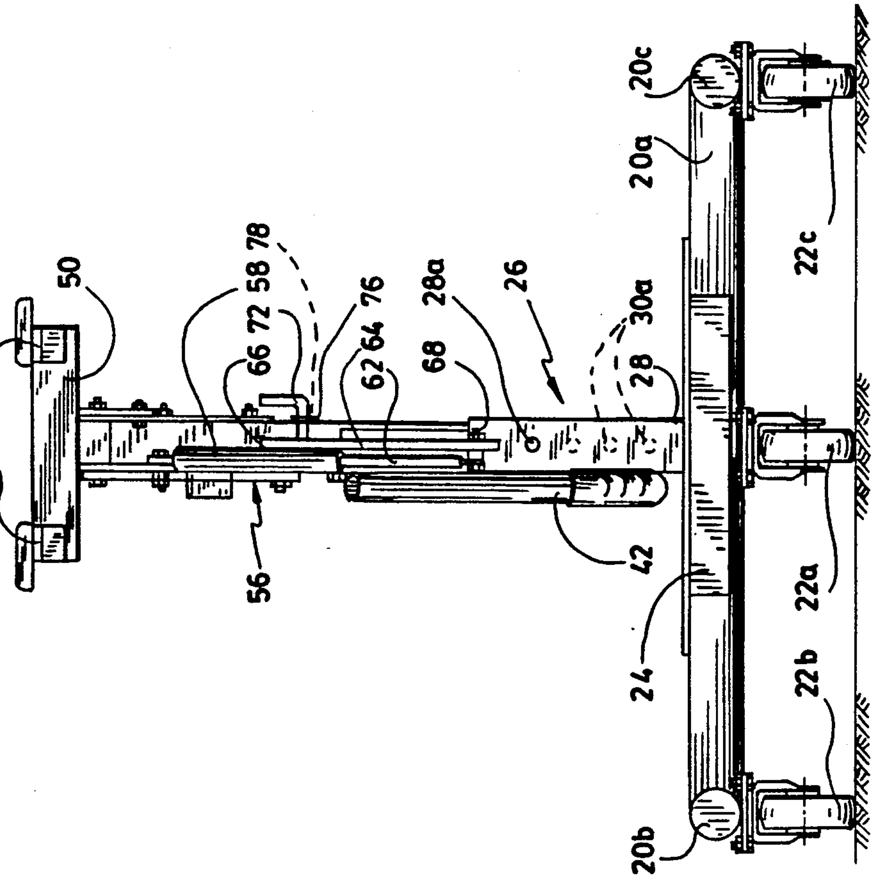
FIG. 3 is a front elevation of the present lifting device, in raised position.

In the same fashion, in the ram-unloaded condition of lift means, illustrated in FIG. 2, the linkage arrangement is stabilized in that elongated handle 42 and associated link arm 52 are substantially colinear with their respective horizontal pivot axles 40 and **52*a*-52*b*. Consequently, as the lift jack is lowered, the lift vehicle tube 16 will not sink brutally with lifted U-bracket 54 but rather will move slowly initially at least. Again, the speed at which the vehicle is lowered is manually controlled at the outer end of handle lever 42, at a very small required power output, e.g. 1:10, compared with a similar arrangement lacking the power assist means 58, 62. Preferably, in this ram unloaded condition of lift means 18, J-bolt 72 lockingly releasably engages a through-bore 74 made transversely of rectangular handle plate 38 at an intermediate section thereof opposite pivot axle 40, to releasably lockingly maintain the lift assembly in vehicle lifted condition (for enabling a mechanic to work underneath the vehicle 10**).

Ram means 56 is not connected to any source of pressurized fluid (e.g. hydraulic) or any other fluid supply source of any kind.

It is understood that the ram means 56 needs necessarily to be initially "primed" i. e. ram-loaded, before the lift device can be used in the afore-noted fashion. A substantial manual force will have to be applied at handle 42 during this ram-loading, to compress the compressible fluid inside the ram cylinder 56, but this can be done with one operator aided by one or two assistants, and the J-bolt 72 manually engaged thereafter rearwardly of rectangular plate 38 at the upright J-bolt clearing position of handle 42. The operator will have to do this only once, and thereafter the lift means 18 will be actuatable and deactuatable several hundred times, in an effortless fashion, by a single operator.

It is understood that the present lift jack may be used for the servicing of a variety of different small vehicles, such as snowmobiles, all terrain vehicles, small tractors, motorcycles, and the like.

The present lift jack was reduced to practice into a device having the following features:

(a) the piston member of the telescopic standard had a seven inch vertical play;

(b) the handle lever measured more than one foot in length;

(c) the ram means cylinder was a gaz cylinder having about a four inch piston rod extension/retraction play, and a push force of 150 pounds.

I claim:

1. A vehicle-servicing lift jack for lifting part of a generally ground standing vehicle, comprising:

(a) a ground standing lift jack frame;

(b) bracket means, to be movably connected to said lift jack frame and destined to releasably engage said vehicle part to be lifted;

(c) hand-operated lifting means, for manually progressively lifting said vehicle part from a ground position to a raised position;

(d) lock means, for releasably locking said lifting means at said raised position;

(e) power assist means, for substantially reducing the required manual force to be applied at said hand-operated lifting means during said vehicle lifting, said power assist means comprising:

means for collecting and storing at least a substantial portion of the potential energy differential of said vehicle as said vehicle is lowered from its raised position to its said ground position; and means for restoring said stored energy, as said vehicle part is subsequently lifted from its said ground position, and for transforming this restored energy into a non-reciprocating, spring-back, upwardly directed, biasing load for aiding in the lifting effort required at said hand-operated lifting means; and (f) coupling means, operatively interconnecting said power assist means to said lifting for concurrent lifting action thereof, wherein said coupling means includes:

a parallel linkage member;

first mounting means, connecting said hand-operated lifting means to said parallel linkage member for relative movement thereabout;

second mounting means, connecting said parallel linkage member to said lift jack frame for relative movement thereabout;

third mounting means, connecting said parallel linkage member to said bracket means, for relative movement of the latter with respect to said lift jack frame;

fourth mounting means, connecting said power assist means to said first mounting means, for relative motion thereabout;

fifth mounting means, connecting said power assist means to said lift jack frame for relative movement thereabout; wherein said power assist means is independent of any external source of energy other than the weight of said vehicle.

2. A lift jack as defined in claim 1, further including second lock means, to maintain said power means in fully loaded condition, and a safety means, integral to said coupling means for smooth, progressive release of said power means load upon release of said second lock means, controllingly with manual handling of said lifting means.

3. A lift jack as defined in claim 1, wherein said lift jack frame includes a large planar base which is wheel carried for free stable rolling ground motion of said lift assembly.

4. A lift jack as defined in claim 7, wherein said lift jack frame further includes a telescopic tube standing upright on said planar base; and defining a lower male member and an upper extensible female member; said second mounting means mounting said parallel linkage member to an upper portion of said jack frame female member; said fifth mounting means mounting said power assist means to a lower portion of said lift jack frame female member; and adjustment means, to releasably lock said female member at a selected partially extended position of said female member.

* * * * *